United States Patent [19]

Van Deuren

[11] Patent Number: 4,817,930

[45] Date of Patent: Apr. 4, 1989

[54] GUIDING DEVICE

[75] Inventor: Fransiscus H. Van Deuren, Eindhoven, Netherlands

[73] Assignee: U.S. Philips Corporation, New York, N.Y.

[21] Appl. No.: 119,462

[22] Filed: Nov. 9, 1987

[30] Foreign Application Priority Data

May 13, 1987 [NL] Netherlands ............... 8701139

[51] Int. Cl.[4] .............................. B23Q 1/02
[52] U.S. Cl. ................................. 269/73; 269/285
[58] Field of Search ............... 29/834; 384/8, 12, 99; 414/749; 269/73, 71, 285; 108/143

[56] References Cited

U.S. PATENT DOCUMENTS

| | | | |
|---|---|---|---|
| 3,272,568 | 9/1966 | Koorneef et al. | 384/8 |
| 4,129,291 | 12/1978 | Kato et al. | 269/73 |
| 4,234,175 | 11/1980 | Sato et al. | 269/73 |
| 4,392,642 | 7/1983 | Chitayat | 269/73 |
| 4,449,834 | 5/1984 | Franken et al. | 384/99 |
| 4,630,942 | 12/1986 | Tsumaki et al. | 269/73 |
| 4,644,642 | 2/1987 | Wardenaar et al. | 29/834 |
| 4,684,315 | 8/1987 | Sugishima et al. | 269/93 |

FOREIGN PATENT DOCUMENTS 61-4633  1/1986  Japan ..................... 269/73

Primary Examiner—Robert C. Watson

[57] ABSTRACT

A guiding device comprising a carriage portion (13), which is aerostatically journalled on a base portion (11) and is guided in a rectilinear movement by means of five pre-stressed air bearings (21) in two guide planes of the base portion (11) enclosing an angle with each other. The air bearings (21) are pre-stressed by means of a magnet system comprising a permanent magnetic part and a ferromagnetic part, which are provided on the base portion and the carriage portion. Due to the fact that the magnetic system is arranged at an angle so that the plane of symmetry through the centre line of the magnet system encloses an acute angle with the two guide planes, all air bearings are pre-stressed solely by the magnet system. With the use of a linear electric motor (29) with permanent magnets for the drive of the carriage portion (13), the armature (41) and the stator (31) of the electric motor act at the same time as magnet system for pre-stressing the pre-tension air bearings.

11 Claims, 3 Drawing Sheets

GUIDING DEVICE

The invention relates to a guiding device comprising at least one base portion, at least one aerostatically journalled carriage portion displaceable with respect to the base portion and a drive for the carriage portion, said base portion being provided with guide tracks, said carriage portion being provided with a plurality of bearing feet, which cooperate with the guide tracks and in which ducts are provided for the supply of pressurized air for generating and maintaining air cushions, which act as air bearings, the said guiding device further comprising means for pre-stressing the air bearings.

Such a guiding device is known U.S. Pat. No. 4,392,642. In this known guiding device a carriage is supported and guided during the rectilinear displacements by seven air bearings; the carriage bears with three bearing feet on a horizontal surface of a guide block and is positioned in a direction transverse to the direction of displacement by means of two vertical, parallel guide tracks, each guide track cooperating with two further bearing feet. Thus, five out of the six degrees of freedom of the carriage are determined by means of seven bearing feet. The three air bearings supporting the carriage are pre-stressed by the mass of the carriage. The four air bearings serving to guide the carriage are also pre-stressed; however, the manner in which this is effected is not stated in the forementioned patent.

The invention has for its object to improve the positioning accuracy of the guiding device and to increase the positioning speed.

According to the invention, this object is mainly achieved in that the guide tracks define two guide planes encluding an angle with each other and in that the means for pre-stressing the air bearings consist of a magnet system comprising a permanent magnetic part and a ferromagnetic part, which are arranged opposite to each other on the base portion and the carriage portion, the plane of symmetry through the centre line of the magnet system enclosing an acute angle with the two guide planes.

Due to the fact that according to the invention the number of guide planes is limited to two, an improvement of the positioning accuracy of the carriage is obtained with respect to guiding devices having more than two guide planes. By further making use of a magnet system for producing a pre-tension or counterforce on the air bearings and by mounting the magnet system so that the plane of symmetry through the centre line of the magnet system, which centre line is parallel to the longitudinal axes of the guide tracks, is in an oblique position with respect to the two guide planes, it is possible to prestress all the air bearings solely by means of the magnet system.

The ferromagnetic part consists of a strip of ferromagnetic material, which is provided either on the base portion or on the carriage portion, while the permanent magnetic part consists of a plurality of permanent magnets arranged on a ferromagnetic carrier. Preferably, the strip of ferromagnetic material is provided on the longer base portion and the permanent magnets are provided on the shorter carriage portion so that the number of permanent magnets can be reduced to a minimum. Moreover, the length of the ferromagnetic part can be adapted in a simple manner to the length of the base portion and to the required stroke of the carriage portion. The magnets are preferably made of samarium-cobalt or of neodymium-iron-boron. Further pretension means or pre-tension elements are not necessary; more particularly, no large mass and no addition of a further mass are required for producing the pre-tension so that an optimum acceleration of the carriage portion can be obtained. The device can operate with comparatively short cycle times, as a result of which the productivity is increased. Due to the fact that by the measures according to the invention larger masses to be displaced are no longer required, the risk of undesired deformations of parts is reduced, which has a favourable influence on the positioning accuracy.

It should be noted that U.S. Pat. No. 4,505,464 discloses a guiding device comprising a table and a carriage utilizing a magnet system comprising a permanent magnetic part and a ferromagnetic part for producing an attractive force between carriage and table. However, this force is active only in a single plane and serves to obviate the clearance in the roller bearings used.

It is further known from U.S. Pat. No. 3,272,568 to support a carriage in two orthogonal guide planes on air bearings. The air bearings are pre-stressed in that magnetic attractive forces are produced between guide planes and carriage by means of, for each guide plane, individual permanent magnets.

The bearing feet used for the air bearings may be of a construction such as known, for example, from U.S. Pat. No. 4,449,834.

In a preferred embodiment of the guiding device according to the invention, one guide plane comprises first and second guide tracks cooperating with two bearing feet and one bearing foot, respectively, and the other guide plane comprises a single guide track cooperating with two bearing feet. Due to the characteristic arrangement of the carriage portion, with support at three points in one guide plane and support at two points in the other guide plane, five bearing feet are sufficient to determine five degrees of freedom of the carriage portion. The construction is statically determined so that secondary straight line guiding planes may be dispensed with.

It should be noted that the first and the second guide track of one guide plane need not necessarily lie in the same geometrical plane. The two guide tracks may lie in two different geometrical planes if only the two guide tracks are parallel to each other, are orientated with their free surfaces in the same direction and define the one guide plane in cooperation with the three bearing feet by a three-point support.

The two guide planes may enclose with each other an angle from acute to obtuse. Preferably, another preferred embodiment of the guiding device according to the invention is characterized in that the two guide planes are orthogonal and in that the plane of symmetry through the centre line of the magnet system encloses with one guide plane an acute angle and with the other guide plane a complementary angle.

Due to the characteristic angular position of the magnet system with respect to the air bearings, the pre-tension produced by the magnet system is distributed substantially uniformly over the five bearing feet. The point of application of the pre-stressing force should be chosen so that the sum of all moments is zero with the same force on the bearing feet.

In a further preferred embodiment of the guiding device according to the invention, the carriage portion is coupled in a hanging position with the base portion, while the angle the plane of symmetry encloses with one and the other guide plane amounts to 60° and 30°, respectively. Due to this measure, use is advantageously made of the further possibilities offered by the magnetic pretension. A hanging coupling of the carriage portion with the base portion means that the base portion is arranged with the guide tracks directed downwards and forms, bearing on one or more supports, legs or the like, a kind of console, portal or bridge. Such an arrangement has the advantage that free space is available under the carriage portion for supplying, positioning and removing workpieces. Due to the angles of 60° and 30°, respectively, the force of gravity is compensated for and is distributed in such a manner over the bearing feet that all bearing feet are loaded substantially to the same extend.

It should be noted that the aforementioned U.S. Pat. No. 3,272,568 discloses a carriage journalled aerostatically and in a hanging position with magnetic pretension of the air bearings. For each guide plane separate permanent magnets are used.

A carriage portion having a comparatively small mass and having nevertheless a high rigidity is obtained in another preferred embodiment of the guiding device according to the invention in that the carriage portion is made of aluminium and has a framework-like cross-section. Such profiles of aluminium can be manufactured in a comparatively inexpensive and efficient manner by means of an extrusion process.

A further preferred embodiment of the guiding device is characterized in that the base portion is made of granite. This embodiment is used more particularly in guiding devices having a stationary base portion, which need not be displaced. The use of granite for parts of guiding devices is known. Granite is free of stress, is accurate to size, is resistant to aggressive substances and has damping properties.

However, if the base portion is displaceable, for example in the case of an x-y guiding device or an x-y-z guiding device, according to the invention the base portion is made of aluminium and has in cross-section a framework-like profile. As set out already above, such profiles can be manufactured in an efficient and inexpensive manner by extrusion and have a comparatively small mass associated with a high rigidity.

The guiding device according to the invention may be used, for example, in an arrangement for placing components on a substrate according to U.S. Pat. No. 4,644,642. In this known arrangement, the carriage portion is driven by means of a rotating electric motor by a pinion and a rack mechanism. The electric motor and the pinion can be mounted either on the base portion or on the carriage portion in accordance with the construction of the guiding device and the dimensions of the base portion and the carriage portion.

The magnetic means for pre-stressing the air bearings and the drive for the carriage portion are advantageously and efficiently combined in another preferred embodiment of the guiding device according to the invention in that the drive for the carriage portion is constructed as a linear electric motor having permanent magnets with a stator and an armature, which act as a magnet system for pre-stressing the air bearings. Due to these measures, it is sufficent to utilize for pre-stressing all the air bearings the permanent magnetic properties and means of the linear electric motor already present. Further pre-tension means are not required. The permanent magnets may be secured on the one part, that is to say either on the stator or on the armature, while the coils with the ferromagnetic lamination cores are mounted on the other part. However, by preferably mounting on the coils on the armature and the permanent magnets on the stator, the possibility is offered to limit the number of coils to a minimum, to adapt the length of the magnet part constituted by the stator in a simple manner to the required stroke length of the carriage portion and to adapt the magnet force by variation of the number of coils and by lengthening or shortening the armature constituting the ferromagnetic part to the desired value.

It should be noted that it is known from the aforementioned U.S. Pat. No. 4,505,464 to use for the drive of a carriage a linear electric motor; the electric motor comprises permanent magnets and a mass of ferromagnetic material, as a result of which an attractive force is exerted on the carriage, in addition to the weight of the carriage, which is made of granite. However, these forces serve to obviate the clearance of the roller bearings on which the carriage is journalled.

A low-disturbance operation is obtained in another preferred embodiment of the guiding device according to the invention which embodiment is characterized in that a brushless motor is used as the linear electric motor. Such motors have a higher resistance to wear than brush motors. Preferably, a burshless linear motor is used of the kind described in an earlier non-prepublished patent application of the applicant.

The guiding device according to the invention may comprise two carriage portions and two base portions having the aforementioned features for performing x-y movements, the second base portion being coupled with the first carriage portion. In a corresponding manner, the guide device may further comprise a third base portion and a third carriage portion for performing x-y-z displacements, said third base portion being coupled with the second carriage portion or the third carriage portion being coupled with the first base portion.

Preferably, in all embodiments that base portion which remains stationary is made of granite.

The invention will be described more fully with reference to the drawing. In the drawing.

Figure 1:
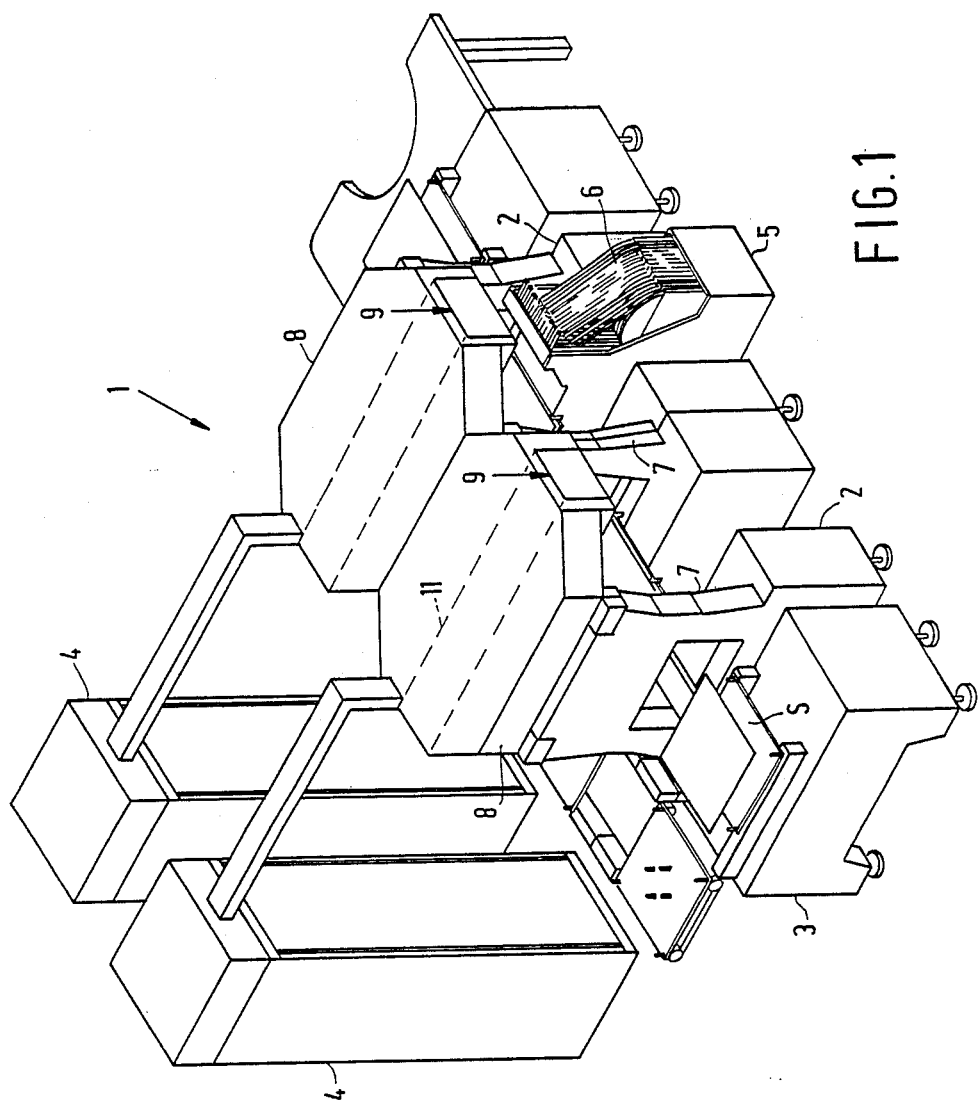
FIG. 1 shows diagrammatically an arrangement for placing electic and/or electronic components on a substrate, this arrangement being provided with a guiding device according to the invention.

FIG. 1 shows diagrammatically an embodiment of an arrangement 1 for placing electric and/or electronic components on substrates. This arrangement 1 mainly comprises two placement units 2 for mounting components, a supply unit 3 for supplying substrates 5 and two control cabinets 4 for controlling the placement units 2. In front of one of the placement units, a container 5 is provided, in which reels 6 with components packed in tape are journalled. For the sake of clarity, in FIG. 1 the container for the other placement unit is omitted. The placement units 2 comprise a simple or multiple mounting head (not shown in the drawing) displaceable in the x-y directions. The guiding device according to the invention designated in FIG. 1 by reference numeral 9 serves to displace the mounting head.

Figure 2:
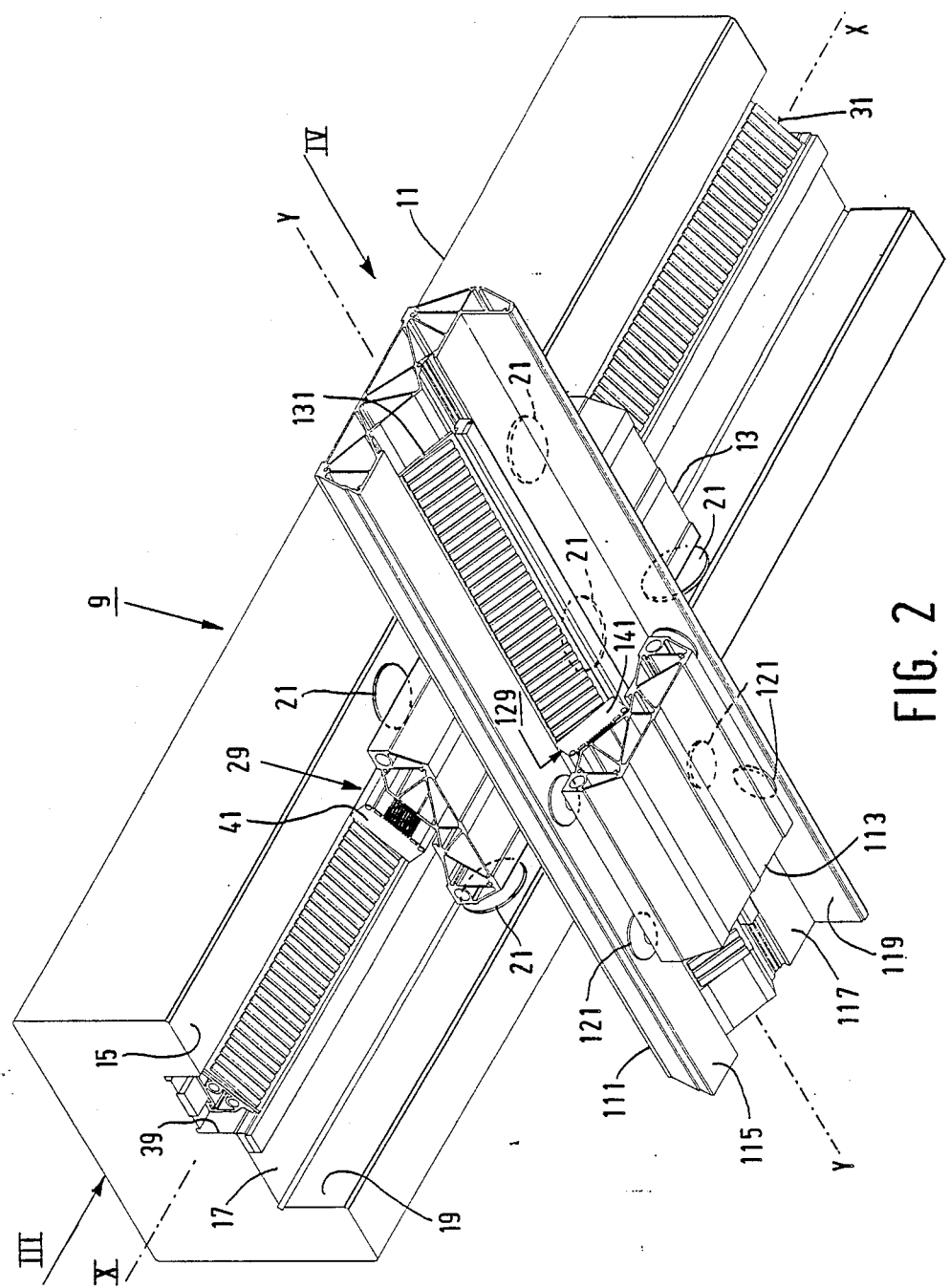
FIG. 2 is a perspective view and a bottom view of an embodiment of the guiding device according to the invention.
Figure 3:
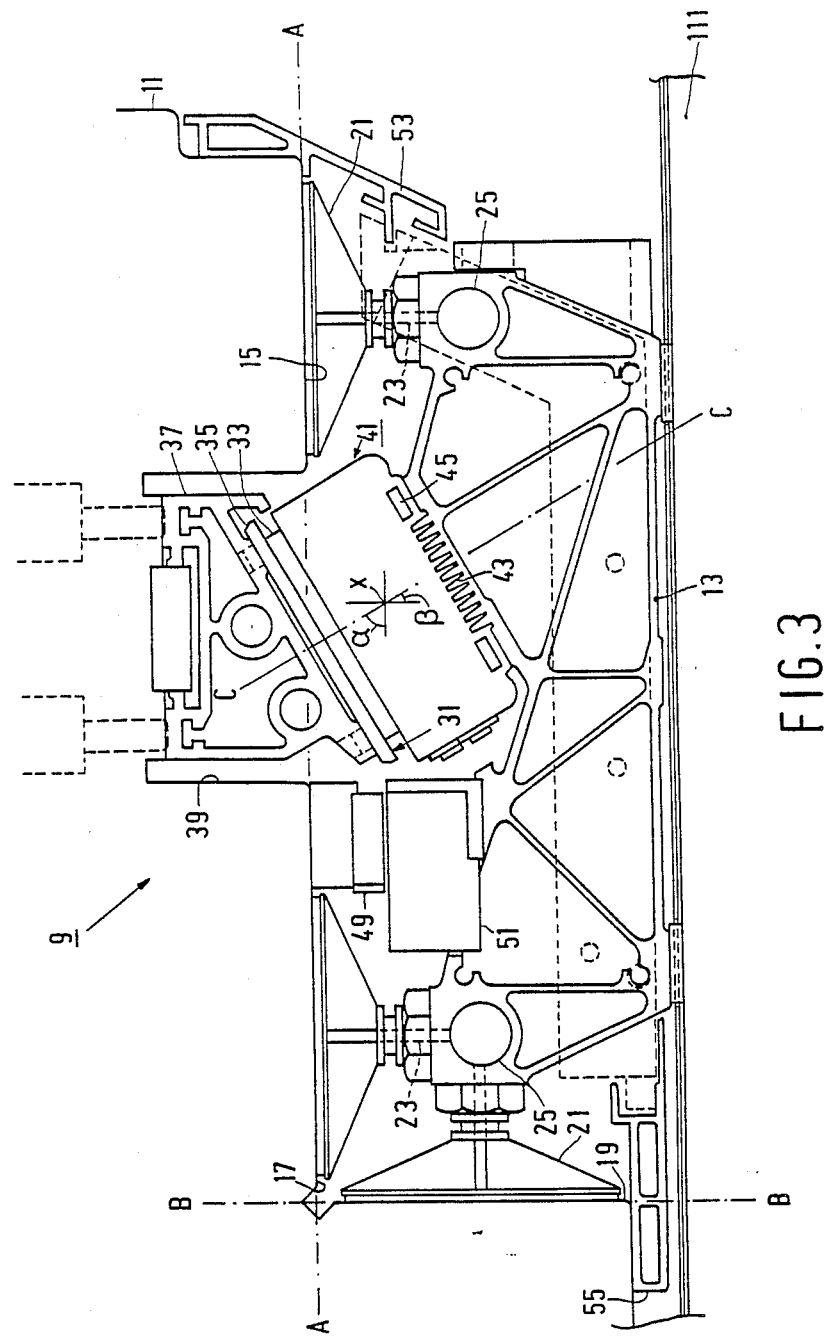
FIG. 3 shows a part of the arrangement viewed in the direction of the arrow III in FIG. 2.

FIG. 2 is a bottom view of the guiding device 9 comprising a first base portion 11, a first carriage portion 13, a second base portion 111 and a second carriage portion 113. The mounting head not shown further is secured on said second carriage portion. The base portion 11 is made of granite and is embedded, as shown in FIG. 1, in a bridge portion 8 of cast iron bearing on two carriers 7, also made of cast iron. The assembly thus constitutes a portal or a bridge so that a sufficient amount of space is available for the transport of the substrates below the mounting heads. In order to permit of obtaining such a construction, the carriage portion 13 is coupled in a hanging position with the base portion 11. In a corresponding manner, the carriage portion 113 is coupled in hanging position with the base portion 111, which is secured to the carriage portion 13. The base portion 11 is provided with guide tracks 15, 17 and 19, which lie in two orthogonal guide planes; as shown in FIG. 3, the guide tracks 15 and 17 lie in a horizontal guide plane A—A, while the guide track 19 lies in a vertical guide plane B—B.

The carriage portion 13 is made of aluminium, is obtained by extrusion, has in cross-section a framework-like profile and consequently has a comparatively small mass, especially as compared with the base portion 11 of granite. The carriage portion is journalled aerostatically by means of five air bearings, three in the horizontal guide plane A—A and two in the vertical guide plane B—B. For this purpose, five bearing feet 21 are provided on the carriage portion 13; two bearing feet in the guide track 15 and one bearing foot in the guide track 17 constitute a three-point support in the horizontal guide plane A—A. By means of two bearing feet in the guide track 19, the carriage portion B is guided in the vertical guide plane B—B. Thus, five degrees of freedom of the carriage portion 13 are determined. The bearing feet are provided with air ducts 23, which are connected to pressurised air leads 25, through which compressed air is supplied for producing and maintaining air cushions, which act as air bearings. Magnetic means are used to pre-stress said air bearings, in order to produce a counterforce. As already set out, a magnet system may be used for this purpose, which comprises a permanent magnetic part and a ferromagnetic part, one part of which is provided on the base portion 11 and the other part of which is provided on the carriage portion 13. Such a separate magnet system is used especially in combination with a rotating electric motor, which provides for the drive of the carriage portion by a worm-screw mechanism or a pinion - rack mechanism. However, in the embodiment shown, the carriage portion 13 is driven by a linear electric motor 29 with permanent magnets. This motor may be advantageously used to pre-stress the air bearing. The electric motor comprises a stator 31, which comprises a series of permanent magnets 33, which are secured on a strip-shaped ferromagnetic carrier 35. The stator 31 is mounted by means of an anchoring profile 37 in a groove-shaped recess 39 of the base portion 11 of granite.

The armature 41 of the electric motor comprising a plurality of coils and a ferromagnetic carrier is secured on the carriage portion 13. The armature 41 is provided with cooling ribs 43 and with cooling ducts 45 for the circulation of a cooling liquid. The electric motor 29 is arranged so that the plane of symmetry C—C through the centre line X—X of the motor encloses an acute angle α and β, respectively, with the horizontal guide plane A—A and the vertical guide plane B—B, respectively. The stator 31 and the armature 41 constitute the magnet system comprising a permanent magnetic part (stator 31) and a ferromagnetic part (armature 41), this magnet system serving to produce the pre-tension on the air bearings. It is also to be understood that what may be called the opposed faces of stator 31 and armature 41 can be identified as lying in surface planes which are perpendicular to the plane of symmetry C—C. As a consequence, these surface planes enclose angles with the horizontal and vertical guide planes which are complements of angles α and β, respectively. Due to the oblique positioning of the electric motor, and that solely as a result of the permanent magnetic attractive force produced by the electric motor the five air bearings are all pre-stressed without the intermediary of further pre-stressing means and the carriage is guided in the two guide planes. It has been found that in the embodiment shown with an angle α of 60° and an angle β of 30°, respectively, the force of gravity is compensated for in a manner such that all air bearings are subjected to the same load; the point of application of the pre-stressing force, in other words the location of the centre line of the electric motor, is chosen so that the sum of all moments is zero.

The position of the carriage portion 13 on the base portion 11 is determined by a known incremental measuring system having a measuring ruler 49 secured on the base portion 11 and an optical sensor 51 secured on the carriage portion 13. The measuring system does not form part of the invention.

In FIG. 3, reference numerals 53 and 55 denote strip-shaped covering elements, which are provided on the two longitudinal sides of the base portion 11. For the sake of clarity, these covering elements are omitted in FIG. 2.

The second base portion 111 and the second carriage portion 113 cooperate in the same manner as the first base portion 11 and the first carriage portion 13. The carriage portion 113 is made, like the carriage portion 13, of aluminium and has a framework-like cross-section equal to that of the carriage portion 13. In contrast with the base portion 11 of granite, the base portion 111 is also made of aluminium and has in cross-section a framework-like profile. As a result, the overall mass to be displaced is kept small.

Figure 4:
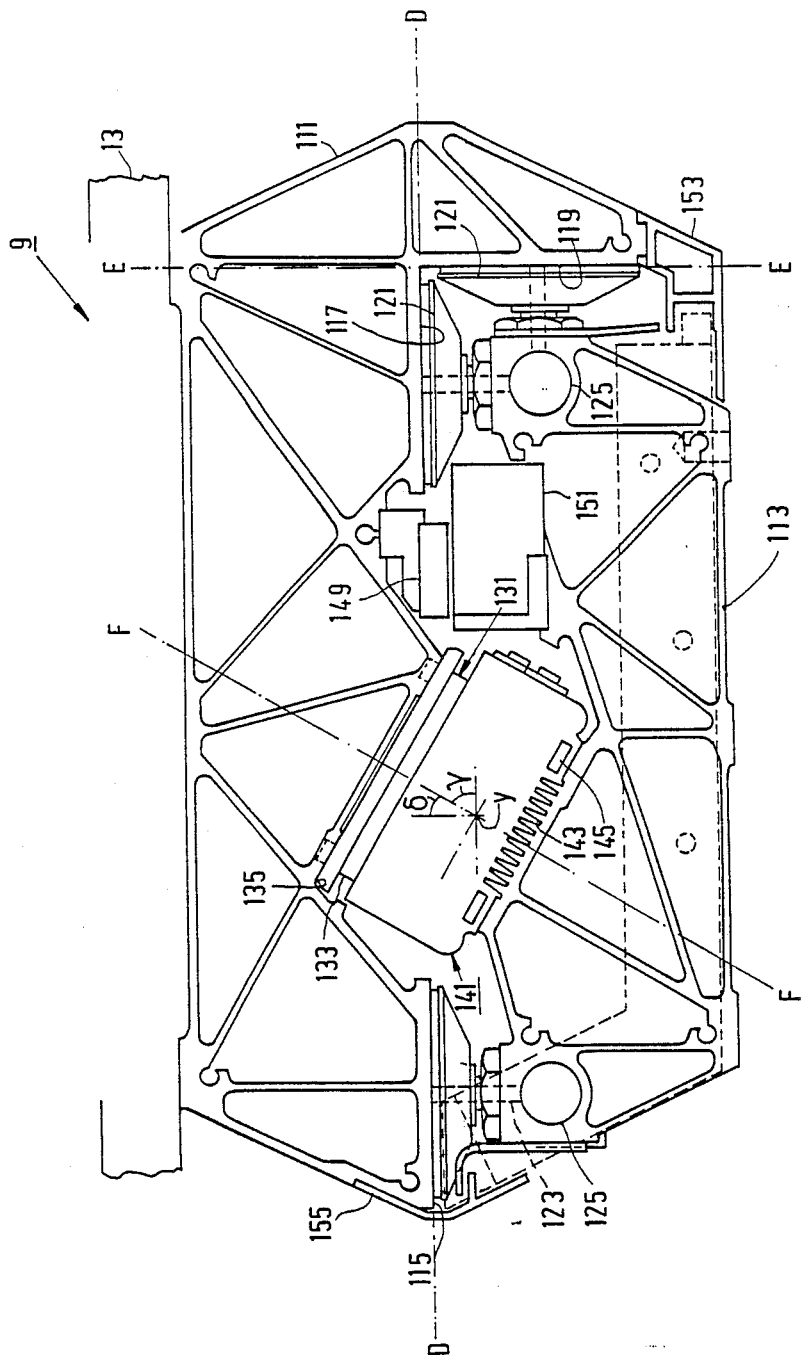
FIG. 4 shows another part of the arrangement viewed in the direction of the arrow IV of FIG. 2.

The base portion 111 is provided with three guide tracks 115, 117 and 119, which are located in two orthogonal guide planes; as shown in FIG. 4, the guide tracks 115 and 117 are located in a horizontal guide plane D—D, while the guide track 119 is located in a vertical guide plane E—E. The carriage portion 113 is likewise journalled aerostatically by means of five air bearings, three in the horizontal guide plane D—D and two in the vertical guide plane E—E. For this purpose, the carriage portion 113 is provided with five bearing feet 121; two bearing feet in the guide track 115 and one bearing foot in the guide track 117 constitute a three-point guiding in the horizontal guide plane D—D. Two bearing feet 121 in the guide track 119 constitute a two-point guiding in the vertical guide plane E—E. Since the bearing capacity of the second assembly comprising the base portion 111 and the carriage portion 113 need not be equal to the bearing capacity of the first assembly comprising the base portion 11 and the carriage portion 13, given parts of the second assembly may have smaller dimensions than the corresponding parts of the first assembly. For example, the bearing feet 121 of the carriage portion 113 have a smaller diameter than the bearing feet 21 of the carriage portion 13 and the guide tracks 115, 117 and 119 of the base portion 111 are correspondingly smaller than the guide tracks 15, 17 and 19 of the base portion 11. The bearing feet 121 are provided with air ducts, which communicate with pressurized-air leads 125. A second linear servo motor 129 with permanent magnets is arranged in a similar manner as the first servo motor 29. The stator 131 comprising the permanent magnets 133 and the carrier 135 of ferromagnetic material is secured directly on the base portion 111 without the intermediary of an anchoring profile. The armature 141 provided with cooling ribs 143 and with cooling ducts 145 is mounted on the carriage portion 113. With a view to a smaller required bearing capacity of the second assembly comprising the base portion 111 and the carriage portion 113, the armature 141 may have a smaller length than the armature 41. The servo motor 129 is also arranged at such an angle that the plane of symmetry F—F through the centre line Y—Y of the servo motor 129 encloses an acute angle γ and δ, respectively, with the horizontal guide plane D—D and the vertical guide plane E—E, respectively. As with carriage portion 13 the faces of stator 131 and armature 141 lie in surface planes which enclose angles with horizontal and vertical guide planes which are complements of angles γ and δ, respectively. Also in this case, a uniform load of the five air bearings is obtained with an angle γ of 60° and an angle δ of 30°, respectively. A measuring ruler 149 and an optical sensor 151 serve to sense the position of the carriage. In FIG. 4, reference numerals 153 and 155 denote covering elements, which are also omitted in FIG. 2 for the sake of clarity. The data of a practical embodiment of the guiding device according to the invention are stated below:

| | | |
|---|---|---|
| Magnetic force of the first servo motor: | 3000 | N |
| magnetic force of the second servo motor: | 1500 | N |
| air gap linear electric motors: | 250 | μm |
| thickness air gap air bearings: | 10 | μm |
| air pressure air bearings: | 6 | bar |
| maximum speed of displacement: | 1.5 | m/s |
| maximum acceleration: | 2 | G |
| positioning accuracy: | 10 | μm |

To the carriage portion 113 is secured an element to be displaced and to be positioned, for example a simple or multiple mounting head for the placement of components, a table, a carrier for a substrate, a tool, a workpiece and the like.

The guiding device according to the embodiment described is provided with two carriage portions, which are coupled in hanging position with the relevant base portions. It will be appreciated that the invention may also be used in guiding devices having a single carriage portion or three carriage portions. A hanging coupling of the carriage portions with the base portions is not required; in the case of a horizontal coupling of the carriage portion with the base portion the same advantageous effects are obtained in principle.

What is claimed is:

1. A guiding device comprising at least one base portion, at least one aerostatically journalled carriage portion displaceable with respect to the at least one base portion and a drive for the at least one carriage portion, said at least one base portion being provided with guide tracks, said at least one carriage portion being provided with a plurality of bearing feet, which cooperate with the guide tracks and in which ducts are provided for the supply of pressurized air for generating and maintaining air cushions, which act as air bearings, said guiding device further comprising means for pre-stressing the air bearings, wherein the guide tracks define first and second guide planes enclosing an angle with each other, and the means for pre-stressing the air bearings includes a magnet system comprising a permanent magnetic part and a ferromagnetic part, which are arranged with opposite surfaces facing each other on the base portion and the carriage portion, respectively the plane of symmetry through the centre line of the magnet system enclosing first and second acute angles with the first and second guide planes, respectively said opposite surfaces of said permanent magnet part and said ferromagnetic part enclosing third and fourth acute angles with said first and second guide planes, said third and fourth acute angles being the complementary angles of said first and second acute angles, respectively.

2. A guiding device as claimed in claim 1, characterized in that said first guide plane is defined by first and second guide tracks, which cooperate with two bearing feet and one bearing foot, respectively, and in that the second guide plane is defined by a single guide track, which cooperates with two bearing feet.

3. A guiding device as claimed in claim 2, characterized in that the first and second guide planes are at right angles to each other and in that the plane of symmetry through the centre line of the magnet system encloses an acute angle with one guide plane and a complementary angle with the other guide plane.

4. A guiding device as claimed in claim 1, 2 or 3, characterized in that the carriage portion is coupled in hanging position with the base portion and in that the angle the plane of symmetry encloses with said first and second guide plane is 60° and 30°, respectively.

5. A guiding device as claimed in claim 1, 2, or 3, characterized in that the carriage portion is made of aluminium and has a framework-like cross-section.

6. A guiding device as claimed in claim 1, 2 or 3, characterized in that the base portion is made of granite.

7. A guiding device as claimed in claim 2 or 3, characterized in that the base portion is made of aluminium and has in cross-section a framework-like profile.

8. A guiding device as claimed in claim 1, characterized in that the drive for the carriage portion is in the form of a linear electric motor with permanent magnets having a stator and an armature, which act as a magnet system for pre-stressing the air bearings.

9. A guiding device as claimed in claim 8, characterized in that a brushless motor is used as the linear electric motor.

10. A guiding device as claimed in claim 1, characterized by a second base portion and a second carriage portion features, the guide tracks of the second base portion and the direction of movement of the second carriage portion being at right angles to the guide tracks of the first base portion and the direction of movement of the first carriage portion, respectively, and the second base portion being coupled with the first carriage portion.

11. A guiding device as claimed in claim 10, characterized by a third base portion and a third carriage portion, the guide tracks of the third base portion and the direction of movement of the third carriage portion being at right angles to the guide tracks of the first and the second base portion and the directions of movement of the first and the second carriage portion, respectively, and the third base portion being coupled with the second carriage portion.

* * * * *